United States Patent
Christ et al.

(10) Patent No.: US 8,752,603 B2
(45) Date of Patent: Jun. 17, 2014

(54) APPARATUS FOR CONNECTING AT LEAST TWO PLATES

(75) Inventors: Eberhard Christ, Tambach-Dietharz (DE); Jörg Thiem, Zella-Mehlis (DE); Marco Werkmeister, Leinatal (DE)

(73) Assignee: EJOT GmbH & Co. KG, Bad Laasphe (DE)

( * ) Notice: Subject to any disclaimer, the term of this patent is extended or adjusted under 35 U.S.C. 154(b) by 57 days.

(21) Appl. No.: 12/854,958

(22) Filed: Aug. 12, 2010

(65) Prior Publication Data

US 2011/0073258 A1    Mar. 31, 2011

(30) Foreign Application Priority Data

Aug. 24, 2009 (DE) .................. 10 2009 038 697

(51) Int. Cl.
    *B32B 41/00* (2006.01)
(52) U.S. Cl.
    USPC ........... 156/358; 156/360; 156/366; 156/367; 156/368; 156/580; 156/581; 156/582
(58) Field of Classification Search
    USPC ......... 156/358, 360, 366, 367, 368, 580, 581, 156/582, 73.5, 73.6; 228/2.1, 68, 114.5
    See application file for complete search history.

(56) References Cited

U.S. PATENT DOCUMENTS

| | | | |
|---|---|---|---|
| 3,477,115 A | | 11/1969 | Martin et al. |
| 3,993,519 A | * | 11/1976 | Birkhold ...................... 156/73.5 |
| 5,108,539 A | * | 4/1992 | Kelley et al. .................. 156/580 |
| 6,296,726 B1 | * | 10/2001 | Pencak ........................... 156/64 |

(Continued)

FOREIGN PATENT DOCUMENTS

| | | |
|---|---|---|
| CN | 100441357 C | 12/2008 |
| CN | 101502911 A | 8/2009 |

(Continued)

OTHER PUBLICATIONS

Fachbeitrage, "Untersuchung zur Anwenbarkeit des Reibbolzenschweissens," Schweissen und Schneiden, DVS Verlag, Dusseldorf, DE. 46 (1994), No. 7.

*Primary Examiner* — George Koch
(74) *Attorney, Agent, or Firm* — Birch, Stewart, Kolasch & Birch, LLP

(57) ABSTRACT

Apparatus for connecting at least two plates (1, 2) of which a supporting plate (1) comprises a higher strength than a supported plate (2) posed thereon. By means of a connecting element (5) rotated by a rotational feeder unit (11), the connecting element with a collar (6) presses the supported plate (2) onto the supporting plate (1). With a shaft (10) a friction welding connection to the supporting plate (1) is made. The rotational feeder unit (11) is provided with a measurement device with measures an axial force exerted by the rotational feeder unit as well as a respective feeding motion and which indicates, upon abutment of the shaft of the connecting element onto the supporting plate, the pressure increase encountered therein, which, thereby, advances the rotational feeder unit, the feeding motion of which is adjustable to at least three sequential connecting stages. Therein, the first stage is adjusted to the penetration of the supported plate, the second stage is adjusted to the friction welding of the shaft with the supporting plate. The third stage completes the friction welding process by putting up the axial force of the connecting element onto the supporting plate 1.

16 Claims, 3 Drawing Sheets

(56) References Cited

U.S. PATENT DOCUMENTS

| | | |
|---|---|---|
| 2002/0027154 A1 | 3/2002 | Satou et al. |
| 2006/0196916 A1 | 9/2006 | Goldstein et al. |
| 2006/0213954 A1* | 9/2006 | Ruther et al. .......... 228/113 |
| 2008/0093420 A1 | 4/2008 | Mauer |
| 2009/0200356 A1 | 8/2009 | Kawaura et al. |
| 2010/0072261 A1* | 3/2010 | Cruz et al. .......... 228/102 |

FOREIGN PATENT DOCUMENTS

| | | |
|---|---|---|
| DE | 19620814 A1 | 11/1997 |
| DE | 10330188 A1 | 2/2005 |
| DE | 102004034498 A1 | 2/2006 |
| EP | 0968788 A2 | 1/2000 |
| WO | WO 9744154 A1 | 11/1997 |

* cited by examiner

APPARATUS FOR CONNECTING AT LEAST TWO PLATES

The invention relates to an apparatus for connecting at least two plates one of which comprises a supporting plate having a higher strength than the supported plate located on top thereof, by means of a connecting element rotated by a rotational feeder, which connecting element presses the supported plate to the supporting plate by means of a collar and produces a friction welding connection to the supporting plates by means of a shaft.

For the production of a friction welding connection between a bolt and a plate, a device has been used according to DE 10 2004 034 498 A1 in which a bolt rotated by a rotational feeder unit is pressed onto a plate with such a rotational speed and such a pressure that, by means of the therein encountered frictional heating between the bolt and the plate, melting of the bolt in the area of contact with the plate as well as melting of the surface of the plate is encountered at this location whereby the process of friction welding is started which, because of an immediate reduction of the friction between the bolt and the plate and a thereby given reduction of the torque, provides a signal that the friction welding process has been effected while maintaining the pressure of the bolt onto the plate and cooling the location of the friction. The apparatus is provided, for this purpose, with a distance sensor, a torque sensor and a pressure force sensor in order to feed with such data a control unit which, there upon, controls the rotational feeder based on the detection of such measurement data and brings it to a still stand in order to allow solidification of the corresponding melt and, thereby, to complete the friction welding connection.

A special friction welding connection of this kind is described and shown in the DE 196 20 814 A1. The friction welding connection disclosed in this publication, is concerned with a three-body-connection consisting out of a two-dimensional metal part and a metallic base which are connected to each other by a connecting body thereby that the connecting body is forced under rotation onto the two-dimensional metal part, courses it to melt in the area of the connecting body and advancing to the metal base with which the connecting body, there upon, is making a connection by friction welding. By means of a collar or a flange, respectively, of the connecting body it exerts pressure onto the two-dimensional metal part, wherein its shaft which has penetrated the two-dimensional metal part, is connected to the metallic base by means of friction welding whereby the multi-body-connection is firmly held together by means of the connecting body.

In order to produce such a multi-body-connection and probably being able to use a practicable procedure, it is necessary, depending on the materials of the plates to be connected, to put the connecting body with a certain pressure down onto the two-dimensional metal part in order to melt its material and, there after also to penetrating into the metallic base where a friction welding connection is formed. The rotational speed and pressure values which are to be respectively maintained therein, are normally evaluated by experiments, and the values of rotational speed sequence and the pressure sequence which have been determined therein as being an optimum during the al connection process, are than maintained during operation in order to be able to produce a sufficiently strong friction welding connection.

The invention is based on the objective to provide an apparatus for connecting at least two plates by means of a connecting element, with which apparatus the respective operation parameters, in particular rotational speed, feeding distance and feeding pressure, may be optionally adjusted, wherein also different materials have to be considered since metal plates as well as plastic plates may be firmly connected to each other by a friction welding process. In the case of connecting two plates which is considered here, the supporting plate must have a higher strength than the supported plate located thereon.

This problem is solved in the above-mentioned apparatus which is characterized in that the rotational feeder unit is provided with a measurement device which measures an axial force exerted by the rotational feeder unit as well as a respective feeding distance and which, upon putting down the shaft of the connection element to the supported plate, signals the pressure raise encountered therein which, thereby, advances the rotational feeder unit the feed motion of which is adjustable at least to three sequential connecting stages, wherein the first stage is adjusted to the penetration of the supported plate, the second stage is adjusted to the friction welding of the shaft with the supporting plate, and the third stage finalizes the friction welding process by putting up the axial force of the connection element to the supporting plate.

By means of the above characterized apparatus, it is possible to adjust the rotational feeding motion required for the process of friction welding, individually with respect to the respective feeding distances and considering the materials of the plates to be connected, which means to allow the rotational feeder to operate with a step length according to the material thickness of the plates to be connected, which step length is adapted to the thickness of the plates to be connected, which step length is adapted to the thickness of the plates to be connected as well as to the materials thereof. In this way, starting from the known thickness of the plates to be connected while considering the material thereof, the length of the distance to be covered stepwise by the rotational feeder is determined which the apparatus is processing, and the desired connection between the plates is automatically produced by means of the connecting element. The process of connecting is adjusted, according to the invention, divided up in three stages which are carried out from a starting position by the rotational feeder, during which a different processing of the material of the plates is effected by means of the connecting element. In the starting position it is about to bring the rotational feeder into a starting position at first thereby that, upon putting the connecting element onto the supporting plate, a pressure increase is originating at the rotational feeder which forms a starting signal for the following three stages of the feeding motion of the connecting element. Because of the ability of the apparatus to indicate the respective position of the connecting element by means of the measurement device associated to the rotational feeder unit, the connecting element can operate accordingly by measuring the covered feeding motion in the three sequential stages, which element then forcibly processes the stages to be covered by it and, thereby, finally produces a friction welding process for connection with the supporting plate. Therein, the length of the first stage is adjusted such that it corresponds to the length of the penetration of the supporting plate, where after, in the following two stages, the friction welding of the shaft is effected with the supporting plate, where after, in the third stage, the friction welding process under the pressure of the rotational feeder unit is finished thereby that the connecting element is compressed onto the supporting plate.

Thereby, the process of connecting the two plates by friction welding is completed in a controlled manner.

In the above described process of interaction of the connecting element with the plates, in order to remove a contamination or coating which is possibly present on the supporting plate, it is possible in an advantage way to control the rotational feeder unit in an intermediate stage between the first and the second stage such that it rotates the connecting element with a rotational speed and an axial force changed with respect to the first stage such that, in this intermediate stage, the surface of the supporting plate is in a way cleaned whereby the friction welding in the second stage is correspondingly set. The changes depend of the strength of the coatings of the supporting plate.

The apparatus is particularly adapted to connect a supporting plate consisting out of steel with a supported plate out of light metal by means of friction welding. Therein, in the first stage, the supported plate consisting out of light metal is penetrated by the connecting element which softens the supported plate in its area in order to thereby starting to melt the surface of the supporting plate and to thereby prepare the friction welding process between the connecting element and the supporting plate.

It is appropriate to form, in this case, the connecting element also out of steel. However, it is also possible to form the plates as well as the connecting element out of plastic material. The connecting element is operated in the first stage by the rotational feeder unit such that a feeding movement of the connecting element is effected in the first stage across the thickness of the supported plate, wherein a rotational speed is set at which the material of the supported plate is flowing in the area of the connecting element because of the friction heating.

The rotational feeder unit rotates, there after, in a second stage the connecting element with a lower rotational speed as compared with the first stage and a higher axial force such that the supported plate starts to melt therein.

In order to complete the friction welding connection between the connecting element and the supporting plate in the third stage, it is appropriate to set the rotation of the rotational feeder to zero in the third stage, whereby the rotational feeder unit effects, while exerting pressure on the connecting element, its compression against the supporting plate whereby the connecting element and the melted surface of the supporting plate are making a firm connection with each other under the axial pressure exerted.

In the Figures, an embodiment of the invention is shown.

Figure 1:
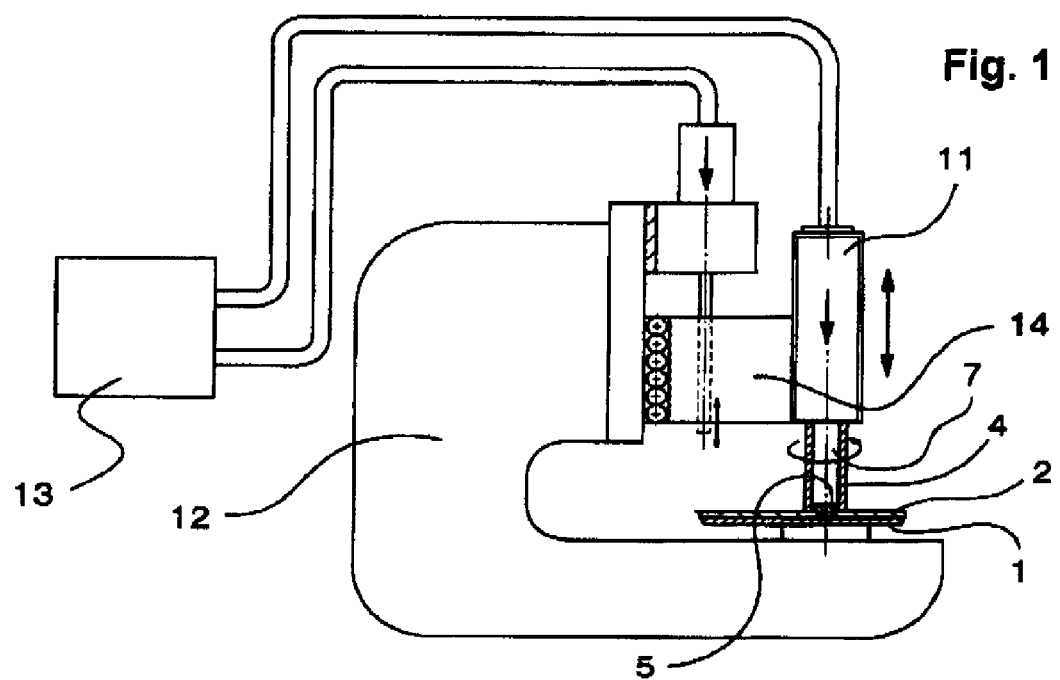
FIG. 1 shows the complete apparatus with rotational feeder unit and measurement device.

In FIG. 1, a principal presentation of the apparatus of the invention is shown which follows the arrangement of the apparatus for friction welding of parts according to DE 10 2004 034 498 A1. The apparatus of the invention comprises a control unit 13 starting from which the mechanical parts of the apparatus, i.e. in particular the rotational feeder unit 11, are controlled which is arranged to be moved in its length direction with respect to a fixed frame 12. The rotational feeder unit 11 comprises a plunger 7 which grips a connecting element 5 each at its lower end and is rotated under axial pressure. The down holder 4 ensures that the plates to be connected to each other, i.e. the supporting plate 1 and the supported plate 2 are firmly adjacent to each other while the connecting element 5 is put down onto the supported plate 2 under rotation and pressure. The respective position of the plunger 7 and, thereby, the connecting element 5 is indicated by the measurement device 14.

Figures 2, 3:
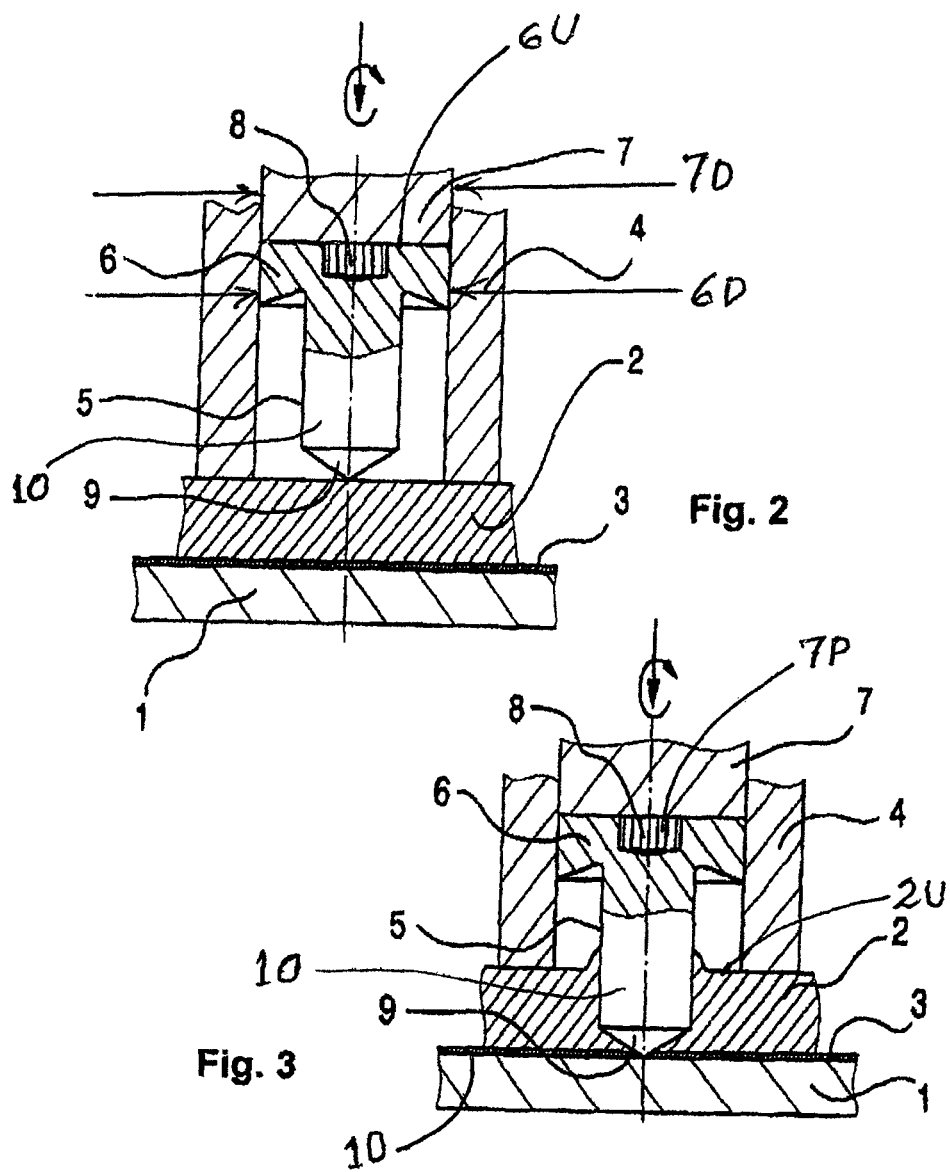
FIG. 2 shows the apparatus with two plates to be connected to each other and a connecting element put on the supporting plate.
FIG. 3 shows the same arrangement as it shown in FIG. 2, however, with the connecting element having penetrated into the supporting plate (stage 1).

In FIG. 2, the supporting plate 1 and the supported plate 2 positioned thereon, are shown which are to be connected to each other. The supporting plate 1 consists, for example, of steel, the supported plate 2 of a light metal, for example aluminum. A layer 3 is drawn up in between the plates 1 and 2 by which layer a protective layer applied to the supporting plate 1, or a layer out of contaminations and/or adhesive, respectively, is represented. The apparatus for connecting the supported plate 2 which is put on top of the supporting plate 1, i.e., by means of the down holder 4 which exerts pressure on an upper surface 2U of the supported plate 2 and, thereby, presses the supported plate 2 down against the supporting plate 1 which is resting in some way on a base which is not shown. In the down holder 4, the connecting element 5 is guided, which comprises a collar 6 at its end facing away from the supported plate 2, the relevance of the collar 6 being given in more detail below. The schematically shown plunger 7 of an apparatus for connecting two plates 1, 2 by means of friction welding (see for example FIG. 1) exerts pressure onto an upper surface 6U the collar 6, whereby a torque can be exerted from the rotated plunger 7 to the connecting element 5 by means of a torx recess 8 and a corresponding protrusion 7P protruding from the plunger 7. As shown in FIGS. 2 and 3, the diameter 7D of the plunger 7 is equal to the diameter 6D of the collar 6, so that the plunger and the collar fit snugly into the down holder.

Consequently, it is a matter of a known arrangement.

The connecting element 5 is shown in FIG. 2 in a position in tip 9 on the end of the shaft 10 of the connecting element 5 is just abutting the upper surface 2U of the supported plate 2. This abutting is detected by a measurement device 14, which is shown in FIG. 1 and which cooperates with the apparatus, i.e. by a sudden fixing of the connecting element 5 during its supply motion to the supported plate 2, which is used as a signal in order to automatically drive a rotational feeder unit 11 of the apparatus, which rotates the plunger 7 and now, while rotating and exerting pressure onto the connecting element 5, presses the shaft 10 of the connecting element 5 into the supported plate 2. During this process, because of the rotation of the plunger 7 and the together with the connecting element 5, a strong friction is generated at the tip 9 of the connecting element 5, which leads to a fast, substantial heating of the material of the connecting element 5 in the area of its tip 9, whereby, the material of the supported plate 2 is softened, causing the tip 9 of the connecting element 5 penetrates into and through the softened material of the supported plate 2 (see FIG. 3). As a result, a friction welding process is initiated between shaft 10 of the connecting element 5 and the upper surface 1U of supporting plate 1, which welds the shaft 10 of the connected element 5 to the upper surface 1U of the supporting plate 1. Meanwhile, the collar 6 of the connecting element 5 presses down on the upper surface 2U of the supported plate 2, so that the supporting plate 2 and the supported plate 1 are connected together.

In case the supporting plate is provided either with a protective coating, with a combination coating and/or adhesive, which is often not possible to avoid, a cleaning of the supporting plate 1 is effected after the process of the penetration of the supported plate 2, in so far as it is freed of its protective coating and contamination coating, respectively, such that the materials of the supported plate 2 and the supporting plate 1 in the area of the tip 9 of the connecting element 5 can be connected to each other and, thereby, a friction welding connection can be established.

Figure 4:
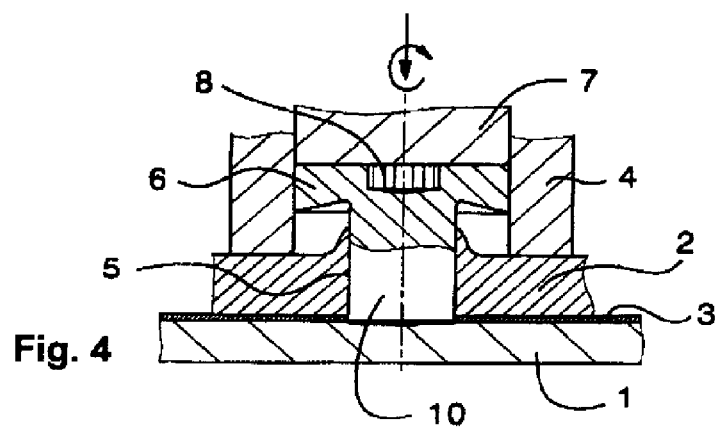
FIG. 4 shows the arrangement similar to FIG. 3, however, with the cone on the front side of the connecting element being abraded (intermediate stage).

The arrangement shown in FIG. 4 as an intermediate stage shows the connecting element 5 having its tip 9 removed by the rotation of the connecting element 5 which has the consequence that the connecting element 5 can rest with its shaft 10 on the supporting plate 1.

Figure 5:
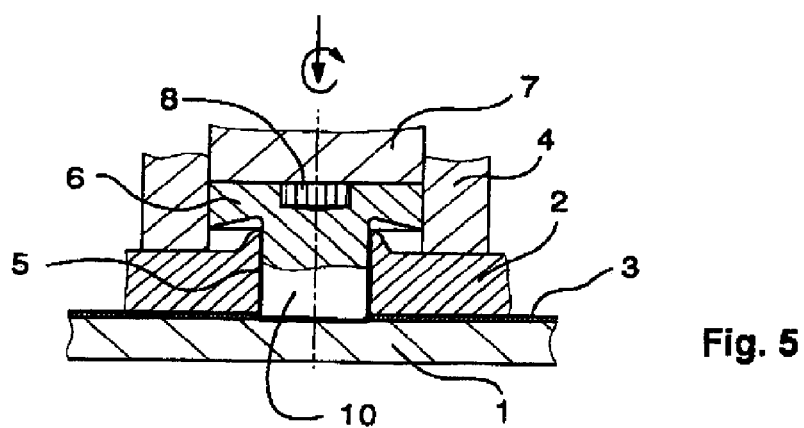
FIG. 5 shows the same arrangement as it is shown in FIG. 4, however, with a friction welding connection between the connecting element and the supporting plate (stage 2).

From the measurement device 14 (see FIG. 1) which is connected to the rotational feeder unit 11, it is indicated at reaching the stages of the connecting element 5 as it is shown in the FIGS. 2 to 6, that a substantial pressure can now be exerted through the connecting element at its still stand for making a firm friction welding connection, wherein its front face makes a connection with the material of the supporting plate 1, whereby the connecting element 5 is connected to the supporting plate 1 by friction welding, as it is shown in FIG. 5.

Figure 6:
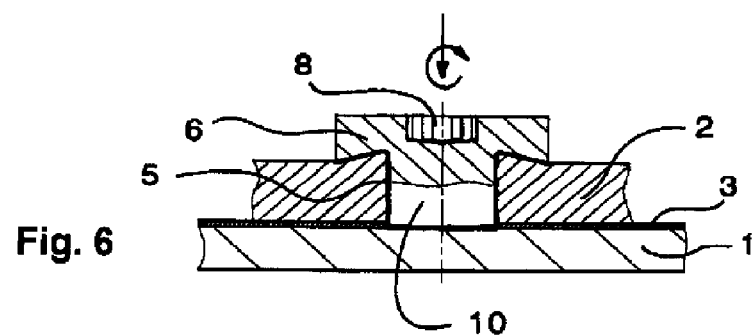
FIG. 6 shows the same arrangement as it is shown in the previous Figures as a finished multi-body-connection.

Now, the apparatus for connecting the respective parts can be removed from the plate 2, where the collar 6 on the connecting element 5 insures that the supported plate 2 is pressed against the supporting plate 1 further on. The final position is shown in FIG. 6.

The invention claimed is:

1. An apparatus for connecting at least a supporting plate having a higher strength than a supported plate located on top of the supporting plate by means of a connecting element having a collar and shaft provided, respectively, on an upper end and a lower end thereof, the apparatus comprising:
a rotational feeder unit including:
a down holder which rests in a fixed non-rotatable position directly on an upper surface of the supported plate and exerts pressure on the supported plate and the supporting plate, and
a plunger which is rotatable within the down holder and moveable in an axial direction of the down holder,
wherein the plunger is connectable to an upper portion of the collar of the connecting element, so that when the plunger connected to the connecting element is rotated within the down holder, the plunger rotates and presses the shaft of the connecting element onto the upper surface of the supported plate, causes the shaft to penetrate though the supported plate to an upper surface of the supporting plate, and produces a friction welding connection on the upper surface the supporting plate,
wherein the rotational feeder unit includes adjustable operational parameters which are set based on a thickness and physical characteristics of each of the supported and supporting plates arranged on the frame, the operational parameters of the rotational feeder unit including rotational speed, feeding distance, and axial force of the rotating plunger,
the rotational feeder unit further comprising:
a measurement device operatively connected to the plunger for measuring the axial force exerted by the rotating plunger and a respective feeding distance of the plunger based on the thickness and the physical characteristics of each of supported and supporting plates, and when the plunger, upon pressing the shaft of the connecting element to the upper surface of the supported plate causes the measurement device to detect an increase in pressure encountered therein, the rotational feeder unit adjusts a downward feed motion of the plunger at least to three sequential connecting stages, wherein:

in the first stage, the rotational feeder unit causes the shaft of the connecting element to penetrate through the thickness of the supported plate,
in the second stage, the rotational feeder unit initiates a friction welding process of the shaft with the upper surface of the supporting plate, and
in the third stage, the rotational feeder unit finalizes the friction welding process by increasing the axial force of the shaft of the connection element to the supporting plate,
during and first stage, the plunger moves downwardly within the down holder by an amount of at least the thickness of the supported plate, and
during the second and third stages, the plunger continues to move downwardly until the collar of the connecting element rests on an upper surface of the supported plate.

2. The apparatus according to claim 1, wherein, in between the first and the second stage, the rotational feeder unit rotates, in an intermediate stage, with a different rotational speed and a different axial force as compared to the first stage.

3. The apparatus according to claim 1, wherein the supporting plate consists of steel.

4. The apparatus according to claim 1, wherein the supported plate consists of light metal.

5. The apparatus according to claim 1, wherein the connecting element consists of steel.

6. The apparatus according to claim 1, wherein the connecting element consists of aluminum.

7. The apparatus according to claim 1, wherein the plates and the connecting element consist of plastic material.

8. The apparatus according to claim 1, wherein a rotational speed and the axial force of the rotational feeder unit are adjusted and set in the first stage based on a thickness of the supported plate, in order to cause material of the supported plate in an area of the connecting element to flow.

9. The apparatus according to claim 1, wherein the rotational feeder unit rotates, in the second stage, with a lower rotational speed and a higher axial force as compared to the rotational speed and the axial force the first stage.

10. The apparatus according to claim 1, wherein in the third stage, a rotational speed of the rotational feeder unit is adjusted to zero, and the plunger of the rotational feeder unit exerts a compressive force against the supporting plate, by exerting a pressure onto the connecting element.

11. The apparatus according to claim 1, wherein a diameter of the plunger is substantially equal to a diameter of the collar of the connecting element, and the plunger and the connecting member are movable together up and down within the down holder.

12. The apparatus according to claim 1, wherein the down holder of the rotational feeder unit is adapted to remain in a fixed position against the upper surface of the supported plate during each of the three sequential connecting stages of producing the friction welding connection.

13. The apparatus according to claim 1, wherein a projection on a lower end of the plunger is adapted to fit into a torx recess on a upper end of the connecting element.

14. The apparatus according to claim 1, further comprising a controller which changes a position and rotational speed of the plunger based on signals received from the measuring device.

15. The apparatus according to claim 1, wherein the down holder is formed with a cylindrically-shaped hole formed along a length thereof, the hole having an inner diameter sized to enable an outer circumferential surface of the plunger to fit snugly against an inner circumferential surface the hole.

16. The apparatus according to claim 1, in order to accommodate a reduction in a length of the shaft of the connecting element as the friction welding connection is created during the three sequential stages, the plunger of the apparatus is adapted to move downwardly by a distance greater than a thickness of the supported plate.

\* \* \* \* \*